US012533286B1

(12) United States Patent
Wu

(10) Patent No.: US 12,533,286 B1
(45) Date of Patent: Jan. 27, 2026

(54) MASTURBATOR DEVICE

(71) Applicant: Dongguan Byphane Industrial Co., Ltd, Dongguan (CN)

(72) Inventor: Yanping Wu, Dongguan (CN)

(73) Assignee: Dongguan Byphane Industrial Co., Ltd, Dongguan (CN)

( * ) Notice: Subject to any disclaimer, the term of this patent is extended or adjusted under 35 U.S.C. 154(b) by 0 days.

(21) Appl. No.: 19/193,354

(22) Filed: Apr. 29, 2025

(51) Int. Cl.
*A61H 19/00* (2006.01)
*A61H 23/00* (2006.01)

(52) U.S. Cl.
CPC .......... *A61H 19/44* (2013.01); *A61H 23/006* (2013.01)

(58) Field of Classification Search
None
See application file for complete search history.

(56) References Cited

U.S. PATENT DOCUMENTS 12,280,004 B1 * 4/2025 Zhao .................. A61H 23/0254

FOREIGN PATENT DOCUMENTS

DE 202024107570 U1 * 2/2025 ............. A61H 19/34
KR 20210157954 A * 12/2021 ........... A61N 5/0603

* cited by examiner

*Primary Examiner* — Thaddeus B Cox
(74) *Attorney, Agent, or Firm* — Justin Lampel

(57) ABSTRACT

The present disclosure provides a masturbator device, which includes a housing and an ejection assembly, where the housing is provided with an inner cavity and a through hole formed in a side wall of the housing and communicated with the inner cavity; the ejection assembly includes a driving member, a transmission member, and an ejection member, where the driving member is provided in the inner cavity, the transmission member is provided on a driving shaft of the driving member, and the ejection member is provided on the transmission member and protrudes from the through hole; and the transmission member is of an integral structure, and disposed eccentrically from the driving member. By using the integrated transmission member, the masturbator device described above can avoid complex connection and transmission problems between traditional multi-section rods, and reduce the risk of jamming.

9 Claims, 5 Drawing Sheets

MASTURBATOR DEVICE

TECHNICAL FIELD

The present disclosure relates to the field of sex toys, and in particular to a masturbator device.

BACKGROUND

The existing masturbator devices have diversified designs, and mainly have functions such as vibration, rotation, and extension. In order to offer stimulation experiences of different levels, the masturbator devices on the market may adopt a motor to drive eccentric motion of multi-section transmission rods to drive a stimulating member to move, thereby generating more intense stimulation.

The prior art that the motor is used to drive eccentric motion of the multi-section transmission rods has many problems. The multi-section transmission rods are connected through ball hinge to realize eccentric motion transmission. This complex transmission relationship may cause high-frequency motion inside the masturbator device to jam. In case of damage, the maintenance cost is very high. In addition, the transmission manner in which the multi-section rods cooperate with a cardan joint cannot generate high-intensity stimulation, thus failing to meet the demand for deep massage experience.

SUMMARY

In view of this, it is necessary to provide a masturbator device that achieves stable and simple transmission, to solve the above problem.

Embodiments of the present disclosure provide a masturbator device, including:

a housing provided with an inner cavity and a through hole formed in a side wall of the housing and communicated with the inner cavity; and an ejection assembly, including a driving member, a transmission member, and an ejection member, where the driving member is provided in the inner cavity, the transmission member is provided on a driving shaft of the driving member, and the ejection member is provided on the transmission member and protrudes from the through hole; and the transmission member is of an integral structure, and disposed eccentrically from the driving member, and configured to, when the driving member is operating, eject the ejection member out of or retract the ejection member into the inner cavity through the through hole.

In at least one embodiment of the present disclosure, the transmission member includes transmission portions and a plurality of protruding portions, where the transmission portion is provided on the driving shaft of the driving member, and is coaxial with the driving shaft; and the ejection member is provided on the protruding portion, and the transmission portion and the protruding portion are alternately arranged.

In at least one embodiment of the present disclosure, the housing further includes a fixed portion, the fixed portion extends inward from the housing, the transmission portion is provided on the fixed portion, and adjacent two protruding portions are raised in opposite directions, such that when the driving member is operating, adjacent two ejection members are ejected out of or retracted into the inner cavity through the through hole alternately.

In at least one embodiment of the present disclosure, the ejection member includes a first ejecting portion, a second ejecting portion, and an annular portion that are integrally arranged, and the protruding portion is inserted on an axis of the annular portion; and the first ejecting portion and the second ejecting portion are respectively provided on two ends of the annular portion and opposite to each other, such that when the driving member is operating, the first ejecting portion and the second ejecting portion are ejected out of or retracted into the inner cavity through the through hole alternately.

In at least one embodiment of the present disclosure, the ejection assembly further includes a flexible member, where the flexible member is provided on the protruding portion, and adheres to an inner surface of the annular portion; and the ejection member further includes a limiting portion, the limiting portion is sleeved on the inner surface of the annular portion, and one side of the flexible member abuts against the limiting portion, so as to limit offset of the flexible member.

In at least one embodiment of the present disclosure, the ejection member further includes stimulating portions, the stimulating portions are respectively provided on ends of the first ejecting portion and the second ejecting portion away from the annular portion, and a stimulating end of the stimulating portion has an arc-shaped surface.

In at least one embodiment of the present disclosure, a direction that the stimulating portion faces the annular portion is defined as a first direction, a projection area of the stimulating portion along the first direction is a, and a projection area of the ejecting portion along the first direction is b, where $a \geq b$.

In at least one embodiment of the present disclosure, the ejection member further includes a first cementing layer and a second cementing layer, the first cementing layer is provided between the flexible member and the protruding portion, and the second cementing layer is provided between the flexible member and the annular portion.

In at least one embodiment of the present disclosure, the housing further includes a divider, the divider divides the inner cavity into a first chamber and a second chamber, the driving member is provided in the first chamber, and the driving shaft of the driving member extends into the second chamber; and the ejection assembly further includes a connector, the connector includes one end sleeved on the driving shaft of the driving member, and the other end sleeved on the transmission member.

In at least one embodiment of the present disclosure, the fixed portion is provided with a cable through, the cable through is parallel to the transmission portion, and configured to fix wires to prevent the wires from affecting rotation of the transmission portion.

By using the integrated transmission member, the masturbator device described above can avoid complex connection and transmission problems between traditional multi-section rods, and reduce the risk of jamming. The overall integrated design makes the transmission more stable and durable. By eccentrically setting the transmission member and the driving member, higher driving force can be directly transmitted, avoiding the loss problem in traditional multi-section rod transmission. This design can achieve higher-intensity reciprocating motion and maintain stability under long-term high-frequency motion, providing strong and lasting stimulation to meet the needs of deep massage.

DESCRIPTION OF SYMBOLS OF MAIN ELEMENTS

Figure 1:
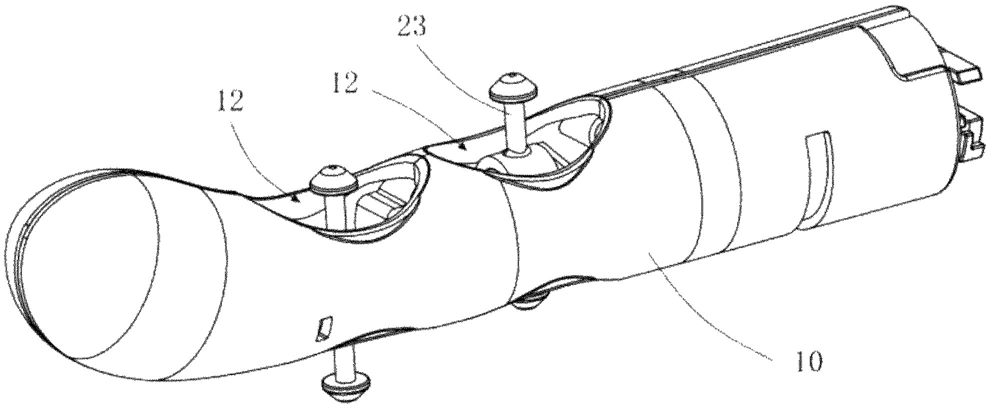
FIG. 1 is a stereoscopic view of a masturbator device according to an embodiment of the present disclosure.

100. masturbator device, 10. housing, 11. inner cavity, 111. first chamber, 112. second chamber, 12. through hole, 13. fixed portion, 131. cable through, 14. divider, 20. ejection assembly, 21. driving member, 22. transmission member, 221. transmission portion, 222. protruding portion, 23. ejection member, 231. first ejecting portion, 232. second ejecting portion, 233. annular portion, 234. stimulating portion, 235. first cementing layer, 236. second cementing layer, 237. limiting portion, 24. flexible member, and 25. connector.

DETAILED DESCRIPTION OF THE EMBODIMENTS

The embodiments of the present disclosure are described below with reference to the accompanying drawings in the embodiments of the present disclosure. It is apparent that the described embodiments are merely some rather than all of the embodiments of the present disclosure.

It should be noted that when a component is "connected" to another component, the component may be connected to the another component directly, or indirectly via an intermediate component. When a component is "arranged on" another component, the component may be directly arranged on the another component or there may be an intermediate component. The terms "top", "bottom", "upper", "lower", "left", "right", "front", "back", and similar expressions used in this article are for illustrative purposes only.

The embodiments of the present disclosure provide a masturbator device, including:

- a housing provided with an inner cavity and a through hole formed in a side wall of the housing and communicated with the inner cavity; and
- an ejection assembly, including a driving member, a transmission member, and an ejection member, where the driving member is provided in the inner cavity, the transmission member is provided on a driving shaft of the driving member, and the ejection member is provided on the transmission member and protrudes from the through hole; and
- the transmission member is of an integral structure, and disposed eccentrically from the driving member, and configured to, when the driving member is operating, eject the ejection member out of or retract the ejection member into the inner cavity through the through hole.

By using the integrated transmission member, the masturbator device described above can avoid complex connection and transmission problems between traditional multi-section rods, and reduce the risk of jamming. The overall integrated design makes the transmission more stable and durable. By eccentrically setting the transmission member and the driving member, higher driving force can be directly transmitted, avoiding the loss problem in traditional multi-section rod transmission. This design can achieve higher-intensity reciprocating motion and maintain stability under long-term high-frequency motion, providing strong and lasting stimulation to meet the needs of deep massage.

Some embodiments of the present disclosure are described in detail below with reference to the accompanying drawings. If no conflict occurs, the following embodiments and features of the embodiments may be combined with each other.

Figure 2:
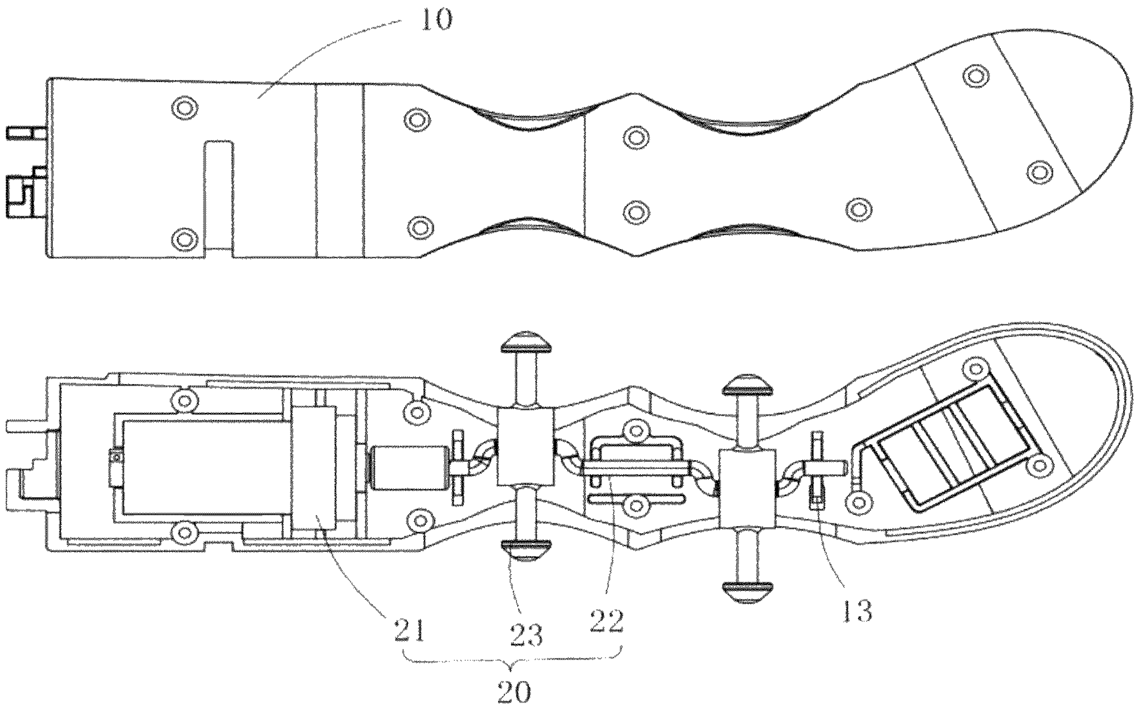
FIG. 2 is an internal stereoscopic diagram of the masturbator device shown in FIG. 1.
Figure 3:
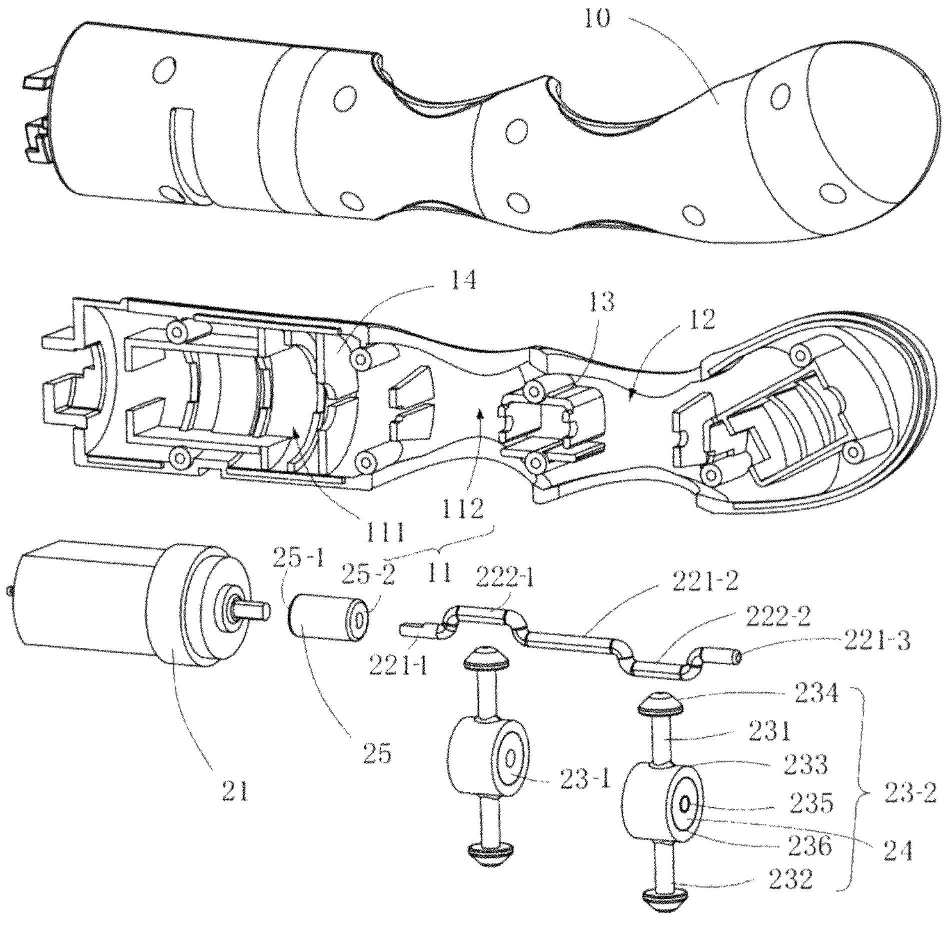
FIG. 3 is a stereoscopic split diagram of the masturbator device shown in FIG. 1.
Figure 4:
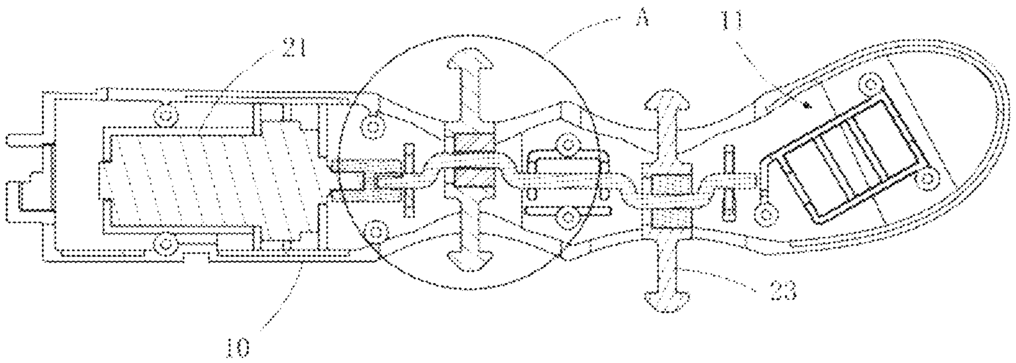
FIG. 4 is a sectional view of the masturbator device shown in FIG. 1.
Figure 5:
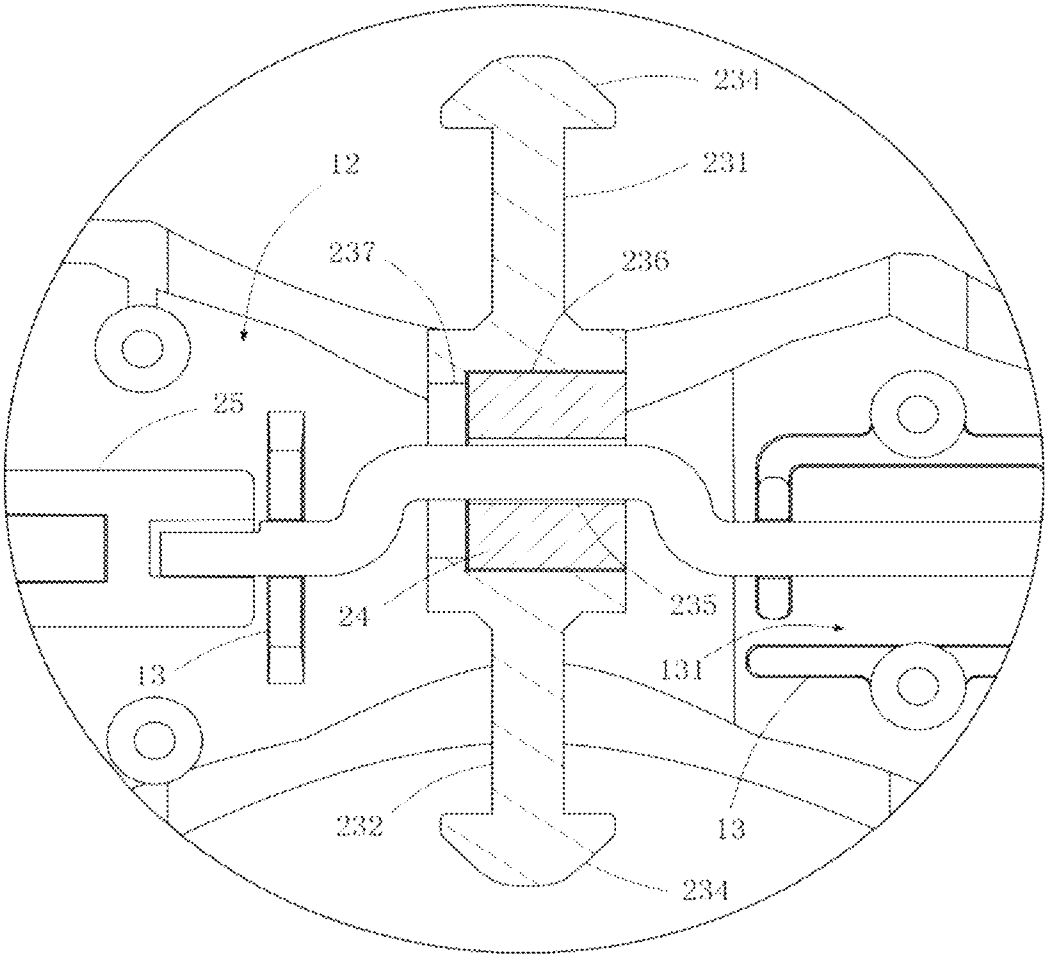
FIG. 5 is an enlarged view of A of the masturbator device shown in FIG. 4.

With reference to FIG. 1 to FIG. 5, an embodiment of the present disclosure provides a masturbator device 100, including a housing 10 and an ejection assembly 20.

The housing 10 is provided with an inner cavity 11 and a through hole 12 formed in a side wall of the housing 10 and communicated with the inner cavity 11.

The ejection assembly 20 includes a driving member 21, a transmission member 22, and an ejection member 23, where the driving member 21 is provided in the inner cavity 11, the transmission member 22 is provided on a driving shaft of the driving member 21, and the ejection member 23 is provided on the transmission member 22 and protrudes from the through hole 12.

The transmission member 22 is of an integral structure, and disposed eccentrically from the driving member 21, and configured to, when the driving member 21 is operating, eject the ejection member 23 out of or retract the ejection member into the inner cavity 11 through the through hole 12.

Specifically, the through hole 12 formed in the side wall of the housing 10 serves as a movement channel of the ejection member 23, such that the ejection member can freely extend and contract between the inside and outside of the housing 10. The housing 10 is wrapped with a soft leather cover (not shown in the figure) to improve sealing, reduce impurities entering into the inner cavity 11, and enhance durability. The ejection member 23 extends out of the leather cover, the transmission member 22 connects the driving member 21 and the ejection member 23, and converts the power of the driving member 21 into the reciprocating motion of the ejection member 23.

Further, the present disclosure adopts an integrated structure, reduces component splicing, improves structural stability, and can maintain stability under long-term high-frequency motion, providing strong and lasting stimulation. The eccentric arrangement causes the transmission member 22 to rotate around a non-central axis, resulting in alternating ejection and retraction movements of the ejection member 23. When the ejection member is retracted, the end of the ejection member 23 will come into contact with the leather cover.

In a specific embodiment of the present disclosure, the transmission member 22 includes transmission portions 221 and a plurality of protruding portions 222, where the transmission portion 221 is provided on the driving shaft of the driving member 21, and is coaxial with the driving shaft; and the ejection member 23 is provided on the protruding portion 222, and the transmission portion 221 and the protruding portion 222 are alternately arranged. In an implementation, the transmission member 22 comprises, in order along an axial direction of the driving shaft, a first transmission portion 221-1 provided on and coaxial with the driving shaft, a first protruding portion 222-1, a second transmission portion 221-2, a second protruding portion 222-2, and a third transmission portion 221-3; and wherein the ejection members comprise a first ejection member 23-1 provided on the first protruding portion and a second ejection member 23-2 provided on the second protruding portion.

Specifically, the transmission portion 221 is a core part of the transmission member 22, and is fixed connected to the driving shaft of the driving member 21, realizing power transmission. Through coaxial arrangement, the rotational stability of the transmission portion 221 is ensured, allowing multiple protruding portions 222 to synchronously receive force, and achieving the preset motion mode.

Further, the protruding portion 222 and the transmission portion 221 are arranged in a Z shape, such that the rotation of the ejecting portion drives the ejection member 23 to make an arc-shaped motion trajectory, allowing the ejection member 23 to perform dynamic actions such as pushing and pulling back. The alternately arranged ejecting portions enable the ejection member 23 to stimulate different points in a woman to achieve deeper stimulation effects.

In a specific embodiment of the present disclosure, the housing 10 further includes a fixed portion 13, the fixed portion 13 extends inward from the housing 10, the transmission portion 221 is provided on the fixed portion 13, and adjacent two protruding portions 222 are raised in opposite directions, such that when the driving member 21 is operating, adjacent two ejection members 23 are ejected out of or retracted into the inner cavity 11 through the through hole 12 alternately.

Specifically, the fixed portion 13 is integrated with the housing 10. This can enhance the internal structural strength. Due to the alternate arrangement of the transmission portions 221, multiple transmission portions 221 can be fixed on the fixed portion 13, which provides installation positions for the transmission portions 221 to allow stable operation thereof, thereby reducing shaking or displacement of the transmission member 22 during high-speed movement, and improving overall stability.

Further, that adjacent two protruding portions 222 are raised in opposite directions means that when one protruding portion 222 drives the ejection member 23 to extend outward, the ejection member 23 of the other protruding portion 222 is in the retracted state. This arrangement ensures that the two ejection members 23 do not move simultaneously, but instead extend alternately from the through hole 12 of the housing 10. Compared to traditional single point or simultaneous stretching massage modes, staggered movements allow stimulation at different areas alternately, enhancing the overall sense of rhythm and layering.

In a specific embodiment of the present disclosure, the ejection member 23 includes a first ejecting portion 231, a second ejecting portion 232, and an annular portion 233 that are integrally arranged, and the protruding portion 222 is inserted on an axis of the annular portion 233.

The first ejecting portion 231 and the second ejecting portion 232 are respectively provided on two ends of the annular portion 233 and opposite to each other, such that when the driving member 21 is operating, the first ejecting portion 231 and the second ejecting portion 232 are ejected out of or retracted into the inner cavity 11 through the through hole 12 alternately.

Specifically, the first ejecting portion 231 and the second ejecting portion 232 are respectively provided on two ends of the annular portion 233. The three form a complete unit, and under the action of the driving member 21, the entire ejection member 23 will move accordingly. The first ejecting portion 231 and the second ejecting portion 232 can move alternately through the through hole 12. The protruding portion 222 is inserted on the axis of the annular portion 233, such that the entire ejection member 23 can move synchronously with the arc-shaped trajectory of the protruding portion 222, and the driving force is evenly distributed throughout the ejection member 23 to prevent deflection or shaking caused by uneven force distribution.

Further, two ejecting portions are symmetrically arranged, and can move alternately in opposite directions. The process of staggered ejection will not result in lateral deviation or imbalance, providing a richer and more layered sense of stimulation. Stereoscopic feel of movement is enhanced by the staggered ejection of the two ejection members 23 in combination of staggered ejection of the two ejecting portions. Movement is not limited to extension and contraction at a single point, but forms a large-scale and layered sense of undulations. The double staggered ejections can act on deeper contact areas, making the stimulation deeper and more uniform.

In a specific embodiment of the present disclosure, the ejection assembly 20 further includes a flexible member 24, where the flexible member 24 is sleeved on the protruding portion 222, and adheres to an inner surface of the annular portion 233.

The ejection member 23 further includes a limiting portion 237, the limiting portion 237 is sleeved on the inner surface of the annular portion 233, and one side of the flexible member 24 abuts against the limiting portion 237, so as to limit offset of the flexible member 24.

Specifically, the flexible member 24 is sleeved on the protruding portion 222, to reduce the impact force when the protruding portion 222 directly drives the ejection member 23, making the movement smoother. The flexible member 24 plays a buffering role, reducing the direct impact between the protruding portion 222 and the annular portion 233, thereby reducing the generation of noise during use. The flexibility of the flexible member 24 can also absorb a part of vibration energy, preventing noise from being amplified through structural resonance, making operation smoother and quieter. Further, the limiting portion 237 restricts the offset of the flexible member 24, such that the flexible member 24 can be better assembled during assembly and desirably fixed, avoiding loosening or sliding caused by long-term use.

In a specific embodiment of the present disclosure, the ejection member 23 further includes stimulating portions 234, the stimulating portions 234 are respectively provided on ends of the first ejecting portion 231 and the second ejecting portion 232 away from the annular portion 233, and a stimulating end of the stimulating portion 234 has an arc-shaped surface. In an implementation, the second ejection member 23-2 further includes a first stimulating portion 234-1 and a second stimulating portion 234-2 respectively provided on two ends of the second ejecting portion away from the annular portion, and a stimulating end of either stimulating portion has an arc-shaped surface.

Specifically, the stimulating portions 234 are respectively provided at distal ends of the first ejecting portion 231 and the second ejecting portion 232. In other words, the stimulating portions are located at the forefront of the ejection member 23 for directly contacting the user's skin or sensitive area. The stimulating end is designed with the arc-shaped surface, which can gently adhere to the skin during device operation, avoiding excessive stimulation or discomfort.

In a specific embodiment of the present disclosure, a direction that the stimulating portion 234 faces the annular portion 233 is defined as a first direction, a projection area of the stimulating portion 234 along the first direction is a, and a projection area of the ejecting portion along the first direction is b, where $a \geq b$.

Specifically, the projection area of the stimulating portion 234 along the first direction is greater than or equal to the projection area of the ejecting portion. The stimulating portion 234 has a larger contact area, achieving a wider contact range during the moving process. The larger contact area can disperse pressure and provide a more uniform pressure distribution. Discomfort or pain caused by a small stimulation point can be avoided, thereby improving user comfort.

In a specific embodiment of the present disclosure, the ejection member 23 further includes a first cementing layer 235 and a second cementing layer 236, the first cementing layer 235 is provided between the flexible member 24 and the protruding portion 222, and the second cementing layer 236 is provided between the flexible member 24 and the annular portion 233.

Specifically, cementing layers are respectively provided on two opposite sides of the flexible member 24 to fix the flexible member 24 on the transmission member 22 and the annular portion 233, so as to prevent the flexible member 24 from loosening or deforming due to friction or vibration during prolonged use. By providing two layers of cementing layers, the ejection member 23 can synchronize the movement of the transmission member 22, preventing problems such as displacement and looseness.

In a specific embodiment of the present disclosure, the housing 10 further includes a divider 14, the divider 14 divides the inner cavity 11 into a first chamber 111 and a second chamber 112, the driving member 21 is provided in the first chamber 111, and the driving shaft of the driving member 21 extends into the second chamber 112.

The ejection assembly 20 further includes a connector 25, the connector 25 includes one end sleeved on the driving shaft of the driving member 21, and the other end sleeved on the transmission member 22. In an implementation, the connector includes a first end 25-1 sleeved on the driving shaft of the driving member, and a second end 25-2 sleeved on the transmission member.

Specifically, the divider 14 is used to divide the inner cavity into two independent chambers, effectively separating different components. The driving member 21 and the transmission member 22 are respectively accommodated in the two chambers, reducing unnecessary mutual influence. Providing two separate chambers makes the internal space more orderly, the device more compact, and improves stability during use. Two divided chambers makes the interior of the masturbator device modularized, allowing for better partitioning of components within each chamber during assembly or disassembly.

Further, the connector 25 effectively connects the driving member 21 with the transmission member 22, ensuring that power is transmitted from the driving member 21 to the transmission member 22 through the driving shaft, and the ejection member 23 or other functional parts is driven through the transmission member 22. This allows each functional component to be designed separately, but the overall work can be completed through the connector 25. The connector 25 ensures a tight fit between the driving member 21 and the transmission member 22, ensuring the accuracy and stability of power transmission. Since the driving member 21 and the transmission member 22 are fixed and connected through the connector 25, it is easy to disassemble, repair or replace individual components by dismantling the connector 25 without disassembling the entire system.

In a specific embodiment of the present disclosure, the fixed portion 13 is provided with a cable through 131, the cable through 131 is parallel to the transmission portion 221, and configured to fix wires to prevent the wires from affecting rotation of the transmission portion 221.

Specifically, the cable through 131 is used to place and secure wires, ensuring that the wires are arranged in a regular pattern and do not interfere with other moving components. The direction of the cable through 131 is consistent with the transmission portion 221, such that the wires can be routed along the axial direction of the transmission portion 221, thereby reducing the displacement or entanglement of the wires during movement.

The above described are merely implementations of the present disclosure. It should be noted here that those of ordinary skill in the art may make improvements without departing from the concept of the present invention, but such improvements should fall within the protection scope of the present disclosure.

What is claimed is:

1. A masturbator device, comprising:

a housing provided with an inner cavity and a through hole formed in a side wall of the housing and communicated with the inner cavity;

an ejection assembly, comprising a driving member, a transmission member, and two ejection members, wherein the driving member is provided in the inner cavity, the transmission member is provided on a driving shaft of the driving member, and the ejection members are provided on the transmission member and protrude from the through hole;

the transmission member is of an integral structure, and disposed eccentrically from the driving member, and configured to, when the driving member is operating, eject the ejection members out of or retract the ejection members into the inner cavity through the through hole;

wherein the housing further comprises a divider, the divider divides the inner cavity into a first chamber and a second chamber, the driving member is provided in the first chamber, and the driving shaft of the driving member extends into the second chamber; and the ejection assembly further comprises a connector, the connector comprises a first end sleeved on the driving shaft, and a second end sleeved on the transmission member.

2. The masturbator device according to claim 1, wherein the transmission member comprises, in order along an axial direction of the driving shaft, a first transmission portion provided on and coaxial with the driving shaft, a first protruding portion, a second transmission portion, a second protruding portion, and a third transmission portion; and wherein the ejection members comprise a first ejection member provided on the first protruding portion and a second ejection member provided on the second protruding portion.

3. The masturbator device according to claim 2, wherein the housing further comprises a fixed portion, the fixed portion extends inward from the housing, the second transmission portion is provided on the fixed portion, and the first protruding portion and the second protruding portion are raised in opposite directions, such that when the driving member is operating, the two ejection members are ejected out of or retracted into the inner cavity through the through hole alternately.

4. The masturbator device according to claim 3, wherein the second ejection member comprises a first ejecting portion, a second ejecting portion, and an annular portion that are integrally arranged, and the second protruding portion is inserted on an axis of the annular portion;

wherein the first ejection member and the second ejection member are structurally identical; and the first ejecting portion and the second ejecting portion are respectively provided on two ends of the annular portion and opposite to each other, such that when the driving member is operating, the first ejecting portion and the second ejecting portion are ejected out of or retracted into the inner cavity through the through hole alternately.

5. The masturbator device according to claim 4, wherein the ejection assembly further comprises a flexible member, wherein the flexible member is provided on the second protruding portion, and adheres to an inner surface of the annular portion; and the ejection member further comprises a limiting portion, the limiting portion is sleeved on the inner surface of the annular portion, and one side of the flexible member abuts against the limiting portion, so as to limit offset of the flexible member.

6. The masturbator device according to claim 5, wherein the second ejection member further comprises a first cementing layer and a second cementing layer, the first cementing layer is provided between the flexible member and the second protruding portion, and the second cementing layer is provided between the flexible member and the annular portion.

7. The masturbator device according to claim 4, wherein the second ejection member further comprises a first stimulating portion and a second stimulating portion respectively provided on two ends of the second ejecting portion away from the annular portion, and a stimulating end of either stimulating portion has an arc-shaped surface.

8. The masturbator device according to claim 7, wherein a direction that the first stimulating portion faces the annular portion is defined as a first direction, a projection area of the first stimulating portion along the first direction is a, and a projection area of the first ejecting portion along the first direction is b, wherein $a \geq b$.

9. The masturbator device according to claim 3, wherein the fixed portion is provided with a cable through, the cable through is parallel to the transmission portion, and configured to fix wires to prevent the wires from affecting rotation of the transmission portion.

* * * * *